United States Patent
Frame

(10) Patent No.: US 8,407,856 B2
(45) Date of Patent: *Apr. 2, 2013

(54) CASTER WITH WEIGHT TRANSFERRING TAB

(75) Inventor: William F. Frame, Hockessin, DE (US)

(73) Assignee: Jacob Holtz Company, Parkesburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,289

(22) Filed: Oct. 25, 2011

(65) Prior Publication Data

US 2012/0110782 A1    May 10, 2012

Related U.S. Application Data

(63) Continuation of application No. 12/115,132, filed on May 5, 2008, now Pat. No. 7,546,662, and a continuation of application No. 12/424,169, filed on May 1, 2009, now Pat. No. 8,042,226.

(60) Provisional application No. 60/916,360, filed on May 7, 2007.

(51) Int. Cl.
*B60B 33/00* (2006.01)
*A47B 91/00* (2006.01)

(52) U.S. Cl. ............................. 16/47; 16/35 R

(58) Field of Classification Search .............. 16/47, 48, 16/35 R, 35 D, 31 R, 44; 188/1.12, 29, 69, 188/31; 280/64, 65, 47.38, 47.39, 47.41
See application file for complete search history.

(56) References Cited

U.S. PATENT DOCUMENTS

| | | | |
|---|---|---|---|
| 19,369 A | 2/1858 | Kinzer | |
| 127,862 A | 6/1872 | Gory | |
| 277,954 A | 5/1883 | Stengel | |
| 292,797 A | 2/1884 | Eberle | |
| 409,495 A | 8/1889 | Pederson | |
| 978,161 A | 12/1910 | Holmes | |
| 1,892,845 A | 1/1933 | McGrath | |
| 1,900,672 A | 3/1933 | Uhl | |
| 2,170,257 A | 8/1939 | Anderson | 16/31 |
| 2,648,073 A | 8/1953 | Nowell | 5/285 |

(Continued)

FOREIGN PATENT DOCUMENTS

DE    2 153 324 A1    5/1973
DE    27 37 649 A1    2/1979

(Continued)

OTHER PUBLICATIONS

"Polycarbonate Caster is Stronger Than Spoked Steel Wheel, Costs Less"; Modern Plastics; vol. 42; Oct. 1964; pp. 109-111.

(Continued)

*Primary Examiner* — Chuck Y Mah
(74) *Attorney, Agent, or Firm* — KED & Associates, LLP

(57) ABSTRACT

The invention consists of a caster comprises a yoke having a weight transferring tab and a wheel with groove for receiving the tab. Preferably, the yoke and wheel are made out of plastic, and in some embodiments two different types of plastic. A tab and groove helps transfer the weight of the load on the castor away from the arms of the yoke and onto the wheel. In a preferred embodiment the plastic wheel is molded so as to include a shaft on either side that snap into receiving holes in the yoke, thus avoiding the need for separate axel and rivets.

15 Claims, 4 Drawing Sheets

U.S. PATENT DOCUMENTS

| | | | |
|---|---|---|---|
| 2,713,179 A | 7/1955 | Clifton | 16/47 |
| 3,060,488 A | 10/1962 | Skupas et al. | 16/18 |
| D220,938 S | 6/1971 | Harlang | D8/226 |
| 3,818,541 A | 6/1974 | Daniels | 16/18 |
| 3,977,040 A | 8/1976 | Sugasawara | 16/45 |
| D245,313 S | 8/1977 | Koepke | D8/375 |
| 4,455,707 A | 6/1984 | Screen | 16/35 |
| 4,646,371 A | 3/1987 | Nowell | 5/200 |
| 4,735,459 A | 4/1988 | Massonnet | 301/1 |
| 5,018,306 A | 5/1991 | Prevot | 49/425 |
| 5,119,525 A | 6/1992 | Melara | 16/18 |
| 5,465,986 A | 11/1995 | MacRae | 280/33.994 |
| 5,537,715 A | 7/1996 | Yang | 16/35 |
| 5,568,671 A | 10/1996 | Harris et al. | 16/18 |
| 5,593,461 A | 1/1997 | Reppert et al. | 29/11 |
| 5,598,605 A | 2/1997 | Tomasiak | 16/45 |
| 5,785,154 A | 7/1998 | Chen | 188/1.12 |
| 6,092,262 A | 7/2000 | Lin | 16/35 |
| 6,351,861 B1 | 3/2002 | Shows et al. | 5/618 |
| 6,397,412 B1 | 6/2002 | Quintile | 5/200.1 |
| 6,419,319 B1 | 7/2002 | Sakurai | 297/344.12 |
| 6,550,100 B2 | 4/2003 | Drucker et al. | 16/31 |
| 6,615,448 B2 | 9/2003 | Melara | 16/35 |
| 6,637,071 B2 | 10/2003 | Sorensen | 16/32 |
| 6,725,501 B2 | 4/2004 | Harris et al. | 16/35 |
| 6,839,939 B2 | 1/2005 | Donakowski | 16/45 |
| D505,316 S | 5/2005 | Topel | D8/375 |
| 7,150,070 B2 | 12/2006 | Donakowski | 16/45 |
| D573,452 S | 7/2008 | Graffunder et al. | D8/375 |
| 7,546,662 B2 | 6/2009 | Frame | |
| D602,769 S | 10/2009 | Frame | |
| 8,042,226 B2 | 10/2011 | Frame | |
| 2002/0178539 A1 | 12/2002 | Donakowski | 16/18 |
| 2005/0108851 A1 | 5/2005 | Dayt | 16/31 |

FOREIGN PATENT DOCUMENTS

| | | |
|---|---|---|
| DE | 31 30 081 A1 | 3/1983 |
| DE | 39 13 722 A1 | 3/1990 |
| EP | 0 268 145 A3 | 5/1988 |
| EP | 0 486 850 A1 | 5/1992 |
| GB | 2 091 090 A | 7/1982 |
| JP | 56-063502 A | 5/1981 |
| JP | 59-038101 A | 3/1984 |
| JP | 07-257104 A | 10/1995 |
| JP | 09-058203 A | 3/1997 |
| JP | 09-226308 A | 9/1997 |
| JP | 2000-052705 A | 2/2000 |
| JP | 2000-225804 A | 8/2000 |
| JP | 2001-334805 A | 12/2001 |
| KR | 10-2003-078984 A | 10/2003 |
| KR | 10-2003-094176 A | 12/2003 |
| WO | WO 99/19157 A1 | 4/1999 |
| WO | WO 00/21410 A1 | 4/2000 |

OTHER PUBLICATIONS

"Dimensions of Design"; Modern Plastics; vol. 42, No. 8; Apr. 1965; pp. 88-94, 175-176.

Hoodbhoy, A.I.; "Designing With Plastics EM Dash Cast Solid-Polyurethane Industrial Tires"; Plastics Engineering; vol. 32; No. 8; Aug. 1976; pp. 37-38.

"Creeper Rolls' Right Over Cords and Cracks"; Advanced Materials and Processes, vol. 162, No. 5; May 2004; p. 10.

International Search Report and Written Opinion dated Aug. 14, 2008 issued in Application No. PCT/US2208/062659.

Chinese Office Action dated Oct. 31, 2011 issued in Application No. 200880014985.6.

European Search Report dated Nov. 29, 2011 issued in Application No. 08 74 7646.

CASTER WITH WEIGHT TRANSFERRING TAB

CROSS-REFERENCE TO RELATED APPLICATIONS

The present application claims the benefit of U.S. patent application Ser. No. 12/115,132 filed on May 5, 2008 which is based on U.S. Provisional application No. 60/916,360 filed on May 7, 2007, and now U.S. Pat. No. 7,546,662; and U.S. patent application Ser. No. 12/434,169, filed on May 1, 2009, all of which are incorporated herein by reference.

STATEMENT REGARDING FEDERALLY SPONSORED RESEARCH OR DEVELOPMENT

The present invention was not developed with the use of any Federal Funds, but was developed independently by the inventor.

BACKGROUND OF THE INVENTION

Casters are well known in the furniture industry as a device for allowing furniture to roll across floors. Casters are a particularly common attachment to bed frames. Traditionally in order to withstand the pressure and weight of beds and people on the beds, the yoke of bed frame casters have been made from metal. In order to reduce cost and weight it is desirable that a caster be manufactured with plastic parts.

SUMMARY OF THE INVENTION

The invention comprises of caster comprised of a yoke with a weight transferring tab and a wheel with groove for receiving the tab. Preferably, the yoke and wheel are made out of plastic, and in some embodiments two different types of plastic. A tab and groove helps transfer the weight of the load on the castor away from the arms of the yoke and onto the wheel. In a preferred embodiment the plastic wheel is molded to include a shaft on either side that snaps into receiving holes in the yoke, thus avoiding the need for separate axel and rivets. In a preferred embodiment the invention includes a bed frame comprised of support members for supporting a bed attached to the caster described herein.

DETAILED DESCRIPTION OF THE INVENTION

Figure 1:
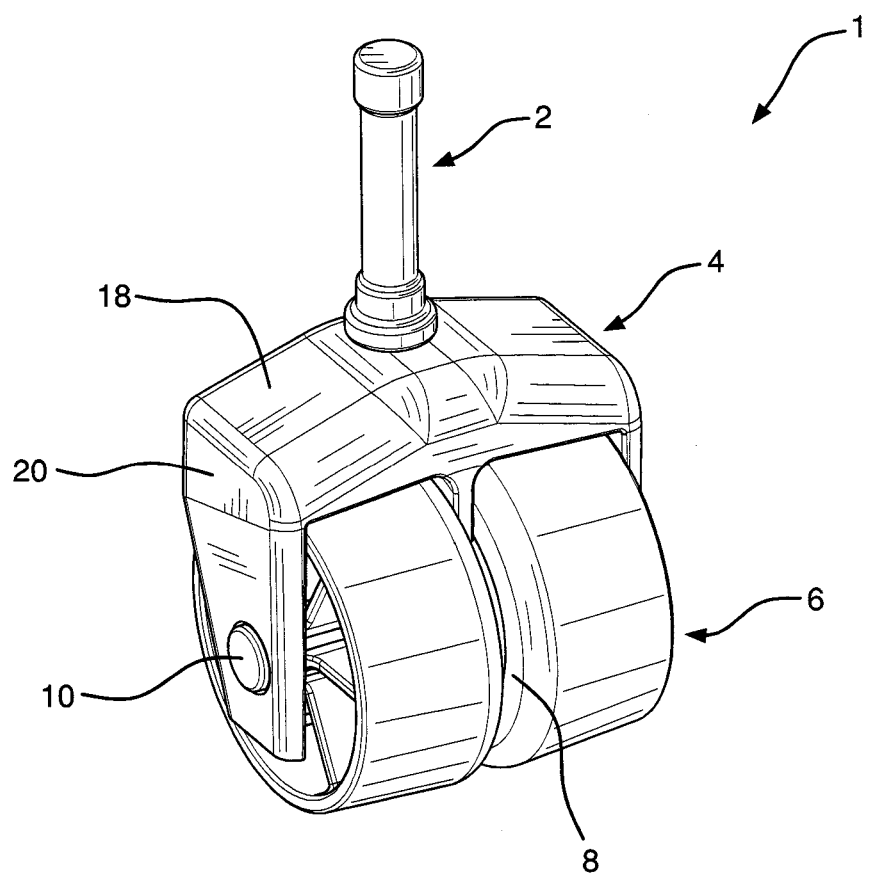
FIG. 1 shows a top perspective view of the caster of the present invention assembled.
Figure 2:
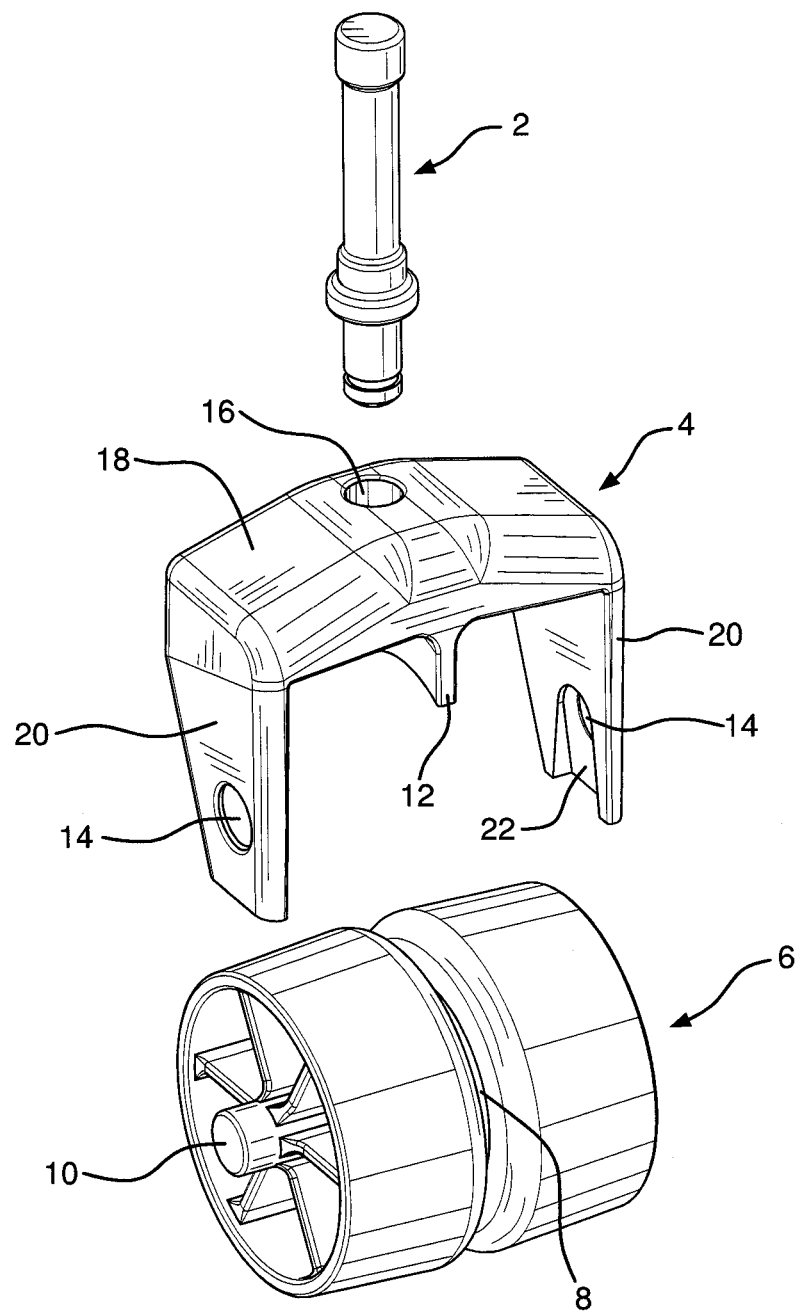
FIG. 2 shows a top perspective view of the caster of the present invention unassembled.
Figure 3:
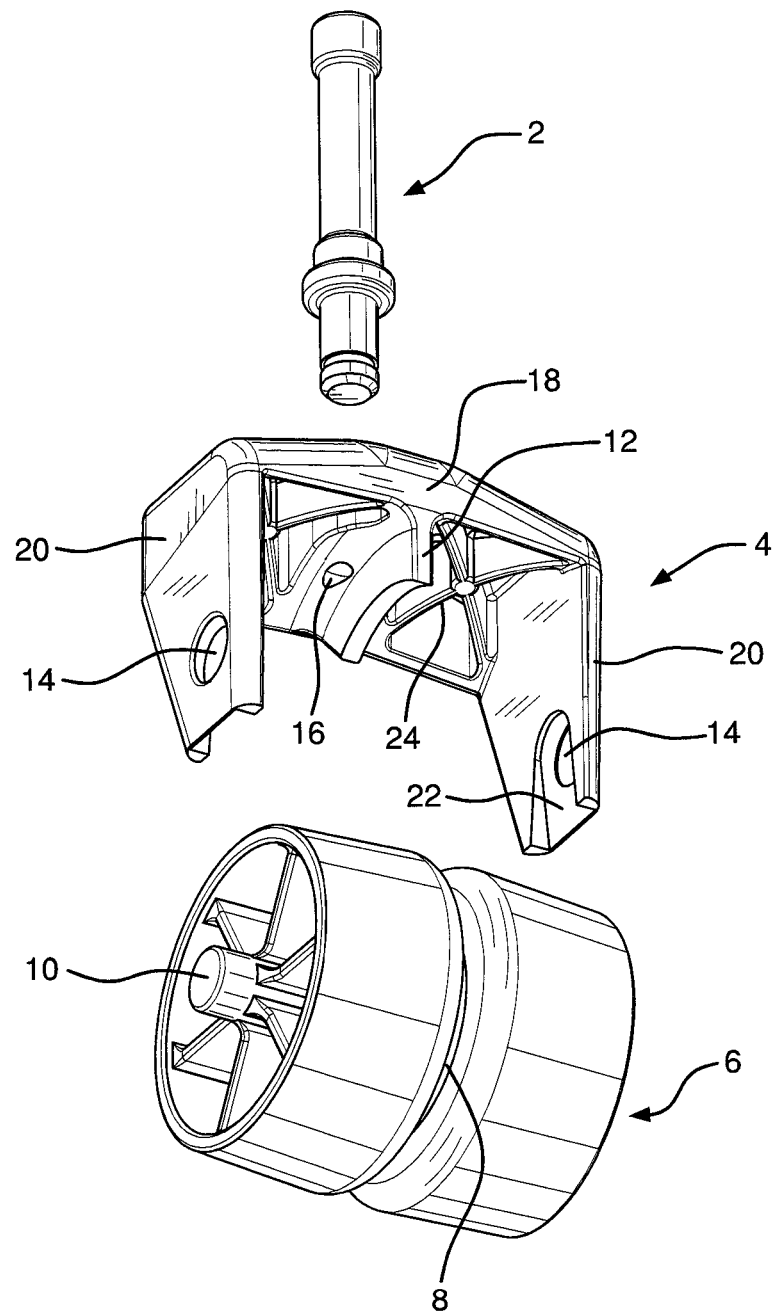
FIG. 3 shows a bottom perspective view of the caster of the present invention unassembled.

FIGS. 1, 2 and 3 show a caster 1 comprising a stem 2, a yoke 4 and a wheel 6. The stem 2 is used to connect to the caster 1 to a piece of furniture (not shown), preferably a bed, although it may be attached to any object including other types of furniture. The stem 2, preferably made out of metal or plastic, connects the caster to the yoke 4 via a hole 16 in the top of the yoke 4. In the preferred embodiment the stem 2 snaps into the hole 16 through pressure.

When using the term "caster" in this application it is meant to refer to either the combination of the stem 2, yoke 4 and wheel 6, or just the yoke 4 and the wheel 6 (without a stem).

The yoke 4 is preferably made out of a single piece of plastic formed through injection molding. The yoke comprises a top portion 18 and two arm portions 20 extending downwardly from the top portion 18 for supporting the wheel 6. The yoke 4 contains a stem attachment hole 16 in the top portion 18 as well as wheel attachment holes 14 on each of the arms 20. The underside of the top portion 18 of the yoke 4 has a tab 12 that extends downwardly from the underside of the top portion 18 that fits into a groove 8 formed in the wheel 6.

In one preferred embodiment the top portion 16 of the yoke 4 has integrally formed ribs 24. These ribs provide additional strength and reduce cost by decreasing the required thickness of the yoke 4 thereby reducing the total quantity of plastic required.

The wheel 6 is preferable made out of a single piece of plastic formed through injection molding. The wheel is substantially cylindrical and has a groove 8 running around its center (coaxially with its axis of rotation). The groove 8 is designed to receive the tab 12. Preferably the wheel 6 has shafts 10 extending on either side about which the wheel rotates when the shafts 10 are snapped into place in the wheel receiving holes 14 of the yoke 4. The wheel 6 may be solid or hollow. The shafts 10 are preferably integrally formed as part of the wheel through injection molding. The shafts 10 serve as a hub or axis of rotation for the wheel 6.

The shafts 10 may be hollow or solid. In one preferred embodiment the caster 1 is assembled without any axel. This reduces cost and weight as neither axel or axel attachment hardware (such as rivets or screws) are required. In another embodiment an axel (not shown) may be added either through the shafts 10, if they are hollow, or instead of the shafts.

In a preferred embodiment the ends of the yoke arms 20 have a beveled area 22 leading to the wheel receiving holes 14. This helps guide the shafts 10 into the wheel receiving holes 14, making it easier to snap the wheel 6 into place in the yoke 4. Preferably the length of the shafts 10 is just slightly longer than the distance between the two receiving holes 14. Thus when the wheel 6 is slid into place, the arms 20 are pushed out slightly by the shafts 10. When the shafts 10 reach the holes 14, the arms 20 snap back into normal position leaving the wheel 6 held securely in place.

In use, the caster 1 is transfers the weight of the bed (or other furniture item) through the stem 2 and the tab 12 onto the wheel 6 relieving the yoke arms 20 of a large portion of the weight bearing load, thus allowing the yoke 6 to be made from a less strong natured than metal, such as plastic.

In the preferred embodiment the yoke 4 and wheel 6 are manufactured from different types of plastic. Preferably, the plastics are selected so that the coefficient of friction between the tab 12 and the wheel 6 is less than the coefficient of friction between the wheel 6 and the floor across which it will roll. This balance ensures that the caster 1 rolls easily when loaded with a mattress and boxspring.

In one preferred embodiment the yoke 4 is fabricated from a glass reinforced nylon material and the wheel is fabricated from an impact resistant polypropylene material.

In one embodiment the caster 1 further comprises a braking mechanism (not shown) to prevent the castor from rolling when the brake is in the locked position.

In another preferred embodiment the brake is not a separate part of the caster. However, the caster 1 is designed so that the tab 12 acts as a brake. Under unloaded conditions the tab 12 does not touch (or barely touches) the wheel 6. When under an expected load the yoke 4 bends sufficiently so that the tab 12 presses more firmly against the wheel 6, thereby acting as a brake. In the case of a caster 1 for use with a bed, the yoke 4 is designed, in this preferred embodiment, so that under the weight of only a bed and box frame the tab 18 does not touch (or barely touches) the wheel 6 and no significant force is applied to the wheel 6 allowing the caster to roll freely. When a person is on the bed, the additional load causes the yoke to bend sufficiently so that the tab 18 presses against the wheel 6, thereby acting as a brake and preventing or significantly reducing the ability of the caster to roll.

In another embodiment the yoke 4 or the wheel 6 may be made out of hardened rubber instead of plastic. Likewise the stem 2 may be made out of any sufficiently strong material, such as plastic or hardened rubber, instead of metal.

In operation when weight is placed on the stem 2 this weight is transferred to the yoke 4. In prior art embodiments, the great majority of the weight (of a bed or other item to which the caster is attached) was placed on the arms 20 of the yoke just above the holes 14 at the point where the arms 20 meet the shafts 10 or axle. Thus, in the prior art, the caster often failed by the arms bending or the shafts bending. Another failure mode of the prior art was for the yoke top 18 to bend down and interfere with the wheel. In the present invention, the tab 12 transfers a great portion of the weight directly onto the wheel 6, thus relieving stress on the arms 20. The use of a groove 8 in the wheel 6 provides a guide for the tab 12 and prevents lateral forces on the tab from becoming too great. The groove also allows the force of the weight transferring through the stem 2 to be placed closer to the center of rotation of the wheel 6 and not on the surface of rotation of the wheel 6. This makes the caster easier to roll under weight. However, in one embodiment of the invention the caster is made without a groove 8.

Exemplary Embodiment and Tests

The following embodiment is exemplary and the dimensions described are not intended to limit the scope of the invention. Likewise the tests described are not meant to be requirements or limitations of the invention.

In one embodiment that the inventor has found to be particularly useful when the yoke is made of glass reinforced nylon and the wheel is fabricated from impact resistant polypropylene. The yoke 4 measures 2.00 inches from the inside of one arm 20 to the inside of the opposite arm 20. The thickness of the tab 18 is 0.116 inches. The wheel 6 measures 1.94 inches across and the groove 8 has a width of 0.146 inches. The diameter of the wheel 6 at the bottom of the groove 8 is 1.298 inches. Each shaft extends 0.21 inches beyond the wheel and has a diameter of 0.370 inches. The tab 18 is of a length such that when the wheel 6 is assembled into the yoke 4, and the caster is not under load, the space between the end of the tab 18 and the bottom of the groove 8 is 0.005-0.010 inches.

A caster made in accordance with these dimensions was fabricated and tested by the inventor. Ten casters were tested and withstood a 660 lb static load test (five times their rated weight) for one minute. Two casters also passed a static load test at 660 lbs of pressure for 24 hours (considered an extreme condition and for outside normal operating conditions to the intended application).

Figure 4:
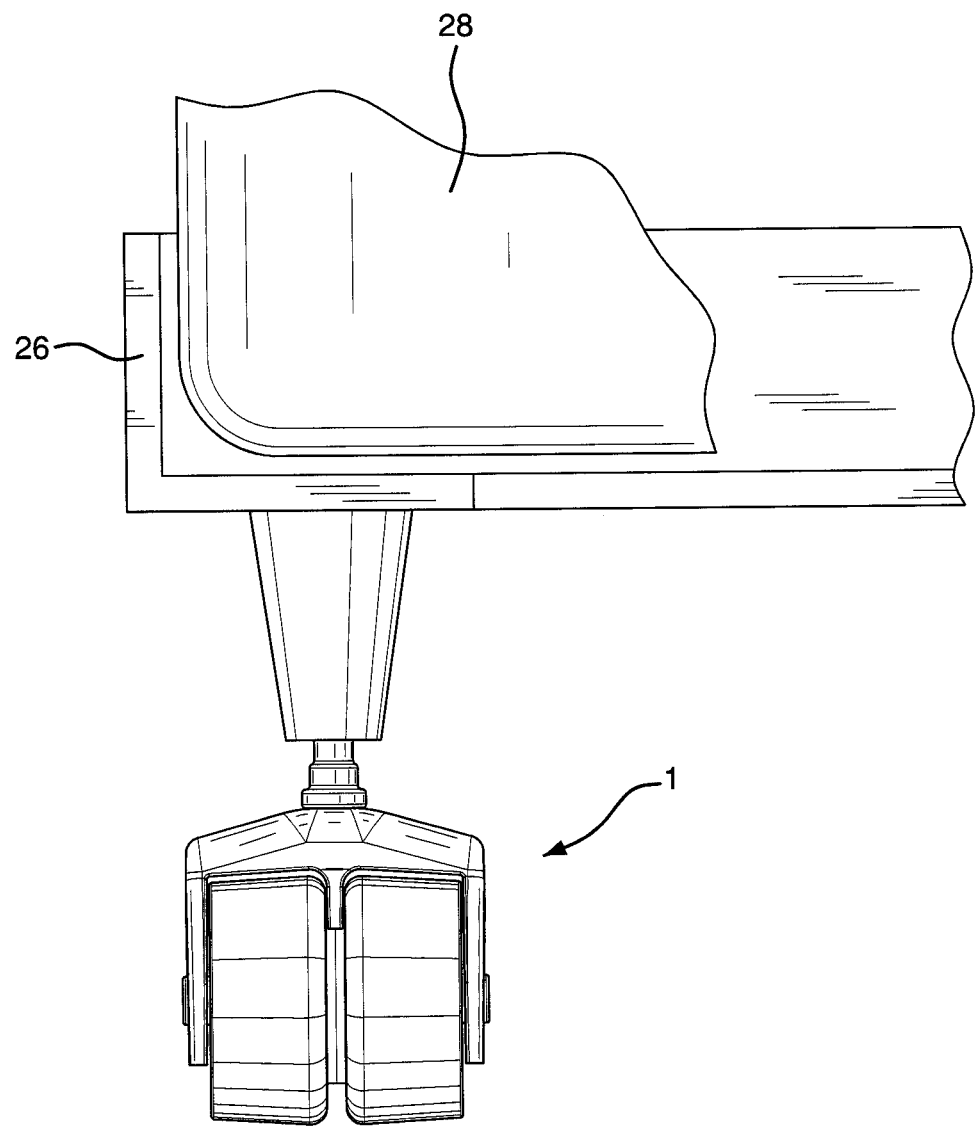
FIG. 4 shows a partial cross sectional view of a bed frame and bed with the caster of the present invention attached.

As has been discussed above, in one preferred embodiment the caster 1 is attached to a bed frame/support member 26 for supporting a bed 28 as shown in FIG. 4. In this embodiment the bed frame is likely to include four casters 1, one at approximately each corner.

While the caster of the present invention was designed for use with a bed frame, the same design may be applied to any caster.

The particularly embodiment described herein is provided by way of example and is not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

I claim:

1. A caster comprising:
    a yoke having a weight transferring tab extending downwardly therefrom;
    a wheel being rotatably supported by the yoke, the wheel having a groove for receiving the weight transferring tab, wherein the tab transfers the weight of a load applied to the yoke to the groove, applying a frictional braking force to the wheel.

2. The caster of claim 1 wherein the tab is located substantially on a centerline of the yoke and the groove is located substantially on a centerline of the wheel and wherein the tab transfers the load applied to the yoke to the groove.

3. The caster of claim 1 wherein the yoke is capable of supporting at least about 500 pounds of weight applied to the caster.

4. The caster of claim 3 wherein the yoke or wheel is made of plastic.

5. The caster of claim 1 further comprising a stem connected to the yoke, the stem receiving the weight of the load applied the caster, and the weight being transferred from the stem to the tab.

6. The caster of claim 5 wherein the stem is disposed substantially on a centerline of the yoke and wherein the tab transfers the load applied to the stem directly to the groove.

7. The caster of claim 5 wherein the stem is attached to the yoke by a snap-fit connection.

8. The caster of claim 1 wherein when the caster is under loaded conditions the yoke bends so that the tab presses against the groove.

9. The caster of claim 1 wherein the yoke is capable of supporting at least about 660 pounds of weight applied to the caster.

10. The caster of claim 1 wherein the groove further comprises a bottom surface and the weight transferring tab contacts the bottom surface of the groove thereby applying the frictional braking force thereto.

11. A caster comprising:
    a yoke made of a plastic material, the yoke being capable of supporting a body weight applied to the caster via a stem by a human, yoke having a weight transferring tab extending downwardly therefrom;
    the stem being attached to the yoke by a snap-fit connection, the stem being made of metal or plastic material;
    a wheel being rotatably attached to the yoke, the wheel having a groove for receiving the weight transferring tab, wherein the tab transfers the weight of a load applied to the yoke to the groove.

12. The caster of claim 11 wherein the yoke further comprises a top portion, a pair of arms extending downwardly from the top portion and wherein the wheel is rotatably supported between the pair of arms.

13. The caster of claim 12 wherein the snap-fit connection of the stem has a cylindrical shape and comprises an annular groove spaced from an enlarged end of the stem and the yoke comprises a cylindrical cavity formed in the top portion of the yoke for receiving the stem therein and forming the snap-fit connection.

14. The caster of claim 13 wherein the caster is for supporting a loaded bed and the yoke being capable of supporting the weight applied to the caster by the bed.

15. The caster of claim 11 wherein the snap-fit connection of the stem has a cylindrical shape and comprises an annular groove spaced from an enlarged end of the stem and the yoke comprises a cylindrical cavity for receiving the stem therein and forming the snap-fit connection.

\* \* \* \* \*